(12) United States Patent
Turk et al.

(10) Patent No.: US 12,301,474 B2
(45) Date of Patent: May 13, 2025

(54) NETWORK PACKET HANDLING

(71) Applicant: Telefonaktiebolaget LM Ericsson (PUBL), Stockholm (SE)

(72) Inventors: Yekta Turk, Ankara (TR); Semiha Tedik Basaran, Istanbul (TR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 17/797,481

(22) PCT Filed: Feb. 16, 2021

(86) PCT No.: PCT/EP2021/053727
§ 371 (c)(1),
(2) Date: Aug. 4, 2022

(87) PCT Pub. No.: WO2021/180434
PCT Pub. Date: Sep. 16, 2021

(65) Prior Publication Data
US 2023/0059974 A1   Feb. 23, 2023

(30) Foreign Application Priority Data

Mar. 11, 2020 (EP) .................................... 20404001

(51) Int. Cl.
*H04L 47/6275* (2022.01)
*H04L 47/24* (2022.01)

(52) U.S. Cl.
CPC .......... *H04L 47/6275* (2013.01); *H04L 47/24* (2013.01)

(58) Field of Classification Search
CPC ............... H04L 47/6215; H04L 47/627; H04L 47/6275; H04L 47/6295; H04L 47/70;
(Continued)

(56) References Cited

U.S. PATENT DOCUMENTS 10,992,396 B1 *  4/2021  Nahata .................. H04B 17/104
2016/0050653 A1 *  2/2016  Rastogi ................. H04W 24/08
455/453

(Continued)

FOREIGN PATENT DOCUMENTS

EP           3618505 A1 *  3/2020  ............ H04W 28/16
WO   WO-2014110410 A1 *  7/2014  ............ H04L 47/22
(Continued)

OTHER PUBLICATIONS

3GPP TS 28,530 v16.0.0; Technical Specification; 3rd Generation Partnership Project; Technical Specification Group Services and System Aspects; Management and orchestration; Concepts, use cases and requirements (Release 16)—Sep. 2019.

(Continued)

*Primary Examiner* — Kevin D Mew
(74) *Attorney, Agent, or Firm* — Baker Botts L.L.P.

(57) ABSTRACT

There is provided a method for handling packets in a network. The method is performed by a first entity. The method is performed in response to receipt of a first packet, from a first network slice in the network, to be scheduled for a first service. A first priority value is assigned to the first packet by a provider of the first service. The method comprises setting (100) a second priority value for the first packet based on a comparison of the first priority value with at least one reference priority value. The second priority value is indicative of a priority with which the first packet is to be scheduled relative to at least one other packet.

10 Claims, 11 Drawing Sheets

(58) Field of Classification Search
CPC ......... H04L 47/20; H04L 47/22; H04L 47/24; H04L 47/2408; H04L 47/2425; H04L 47/2433; H04L 47/2441; H04L 47/2483
See application file for complete search history.

(56) References Cited

U.S. PATENT DOCUMENTS

| | | | | |
|---|---|---|---|---|
| 2016/0338094 | A1* | 11/2016 | Faurie | H04W 72/542 |
| 2017/0055313 | A1* | 2/2017 | Sharma | H04W 36/0066 |
| 2017/0317894 | A1* | 11/2017 | Dao | H04L 41/5009 |
| 2017/0318594 | A1* | 11/2017 | Babaei | H04W 72/56 |
| 2017/0324652 | A1* | 11/2017 | Lee | H04L 47/2458 |
| 2017/0332282 | A1* | 11/2017 | Dao | H04L 1/0002 |
| 2018/0014222 | A1* | 1/2018 | Song | H04W 28/0268 |
| 2018/0139734 | A1* | 5/2018 | Babaei | H04W 72/23 |
| 2018/0270712 | A1* | 9/2018 | Faccin | H04W 72/56 |
| 2018/0324631 | A1* | 11/2018 | Jheng | H04L 5/0055 |
| 2019/0238413 | A1 | 8/2019 | Holmstrom et al. | |
| 2020/0008083 | A1* | 1/2020 | Lei | H04W 24/04 |
| 2020/0029242 | A1 | 1/2020 | Andrews et al. | |
| 2023/0100069 | A1* | 3/2023 | Jager | H04W 48/16 370/329 |

FOREIGN PATENT DOCUMENTS

| | | | | |
|---|---|---|---|---|
| WO | WO-2018059689 | A1* | 4/2018 | ......... H04L 41/0836 |
| WO | WO2019091228 | A1 | 5/2019 | |
| WO | WO2019158219 | A1 | 8/2019 | |
| WO | WO2019164738 | A1 | 8/2019 | |
| WO | WO-2021219723 | A1* | 11/2021 | ............ H04W 48/16 |

OTHER PUBLICATIONS

Yekta Turk and Engin Zeydan, An experimental measurement analysis of congestion over converged fixed and mobile networks; CrossMark; Springer Science+Business Media, LLC, part of Springer Nature—2018.

PCT International Search Report issued for International application No. PCT/EP2021/053727—Apr. 30, 2021.

PCT Written Opinion of the International Searching Authority issued for International application No. PCT/EP2021/053727—Apr. 30, 2021.

European Patent Office, Communication pursuant to Article 94(3) EPC in EP Application No. 21 704 573.1-1215 dated Dec. 23, 2024.

* cited by examiner

Setting a second priority value for the first packet based on a comparison of the first priority value with at least one reference priority value — 100

Assigning a reference priority value to a first service based on one or more priority values assigned to the first service by one or more providers of the first service ⎯200

NETWORK PACKET HANDLING

PRIORITY

This nonprovisional application is a U.S. National Stage Filing under 35 U.S.C. § 371 of International Patent Application Serial No. PCT/EP2021/053727 filed Feb. 16, 2021 and entitled "NETWORK PACKET HANDLING" which claims priority to European Patent Application No. 20404001.8 filed Mar. 11, 2020 both of which are hereby incorporated by reference in their entirety.

TECHNICAL FIELD

The disclosure relates to methods for handling packets in a network. The disclosure also relates to entities configured to operate in accordance with the methods.

BACKGROUND

Network slicing (NS) has become one of the core structures of modern networks, such as fifth generation (5G) networks. Network slicing can be used to categorise multiple virtual networks over a shared single physical framework. Network slicing can also be used to create customised and dedicated virtualised networks in the infrastructure of mobile infrastructure providers (MIPs). For example, virtualized networks created by network slices can be leased to service providers (SPs), such as to mobile virtual network operators (MVNOs), mobile network operators (MNOs), corporate customers, etc. Network slices can be created in an end-to-end manner in a network, as illustrated in FIG. 1.

FIG. 1 illustrates a MIP infrastructure with three network slices. The network slices extend across a core network, a transport network, and a radio access network (RAN). FIG. 1 illustrates a horizontal network slicing. As illustrated in FIG. 1, network slicing can comprise slicing the network based on different service providers, such as dedicating a first network slice ("SLICE 1") to a first service provider ("Service Provider-1"), a second network slice ("SLICE 2") to a second service provider ("Service Provider-2"), and a third network slice ("SLICE 3") to a third service provider ("Service Provider-3"), etc.

Generally, models for network slicing are accelerating and can be attractive for SPs to provide improved services using the already installed infrastructure of MIPs. By using network slicing, SPs can avoid the burden of deploying multiple individual infrastructures. Commonly, the installation, activation and lifecycle management of network slices in the network of MIPs can be managed by an orchestrator. The orchestrator may, for example, be a European telecommunications standards institute management and network orchestration (ETSI MANO) compatible entity that can be positioned inside the network of a MIP.

SPs enforce quality of service (QoS) assignment policies, which dictate the priority with which a packet is to be scheduled relative to other packets. The QoS assignment policies of an SP may be configured in a mobility management entity (MME) in long-term evolution (LTE) cases or an access and mobility management function (AMF) in 5G cases. In an AMF, QoS service profiles are described and configured. These QoS service profiles may include parameters such as a delay tolerance interval of a service, bandwidth requirements of the service, etc. Whenever a service requests to be activated, the service may first establish a control plane (CP) session with the AMF. The AMF can then assign a pre-configured 5G QoS Identifier (5QI) value for the user plane (UP) flow of this service. Since the profile of a service can be pre-configured in the AMF, the AMF may detect the type of service based on the preconfigured service profiles and assign a 5QI value to the service. Finally, according to the obtained 5QI value from the AMF, UP data flow can be initiated to transfer data.

In an SP network, QoS differentiation for different services can be determined by assigning different QoS class identifier (QCI) values in LTE cases, or 5QI values in 5G cases, in order to differentiate these services according to their prioritization. Although the $3^{rd}$ Generation Partnership Project (3GPP) suggests some QoS strategies, it is not necessary for an SP to utilize these predefined strategies. In practical real network implementations, each SP may have its own implementation-specific QoS strategy to provide a diverse set of services. Consequently, the QoS service profile parameters can be defined in terms of QoS policies and these policies can be different from one SP to another, since they are based on the requirements of the services they provide and feedback from customers using the services.

In existing systems, problems can occur when there is more than one SP that leases network slices in the same network node (e.g. 5G new radio (5G NR) node) of the MIP. Although there are QoS strategies recommended by 3GPP, in practice, the QoS strategies are designed by the SPs themselves according to their implementation experiences. For example, multiple SPs may each have individual QoS assignment policies (and may utilise different network slices with different QoS strategies) that may differ from the QoS assignment policies of other SPs depending on the services provided by those SPs. Since all the services from different network slices are scheduled by the same scheduler inside a network node (e.g. 5G NR), an unfair prioritisation problem can occur in the access network (e.g. RAN).

FIGS. 2A and 2B illustrate specific problems for SPs, which can occur in a sliced network. The networks illustrated in FIGS. 2A and 2B are as described earlier with reference to FIG. 1.

As illustrated in FIG. 2A, three different SPs (i.e. "SP-1", "SP-2", and "SP-3") each have a dedicated network slice in the network (i.e. "SLICE 1", "SLICE 2", and "SLICE 3" respectively). As further illustrated in FIG. 2A, each SP has its own unique QoS strategy (i.e. "QoS Strategy for SP-1", "QoS Strategy for SP-2", and "QoS Strategy for SP-3" respectively). The QoS strategy of an SP can comprise a table, which assigns a priority value to a service depending on the service and/or the service type. The priority value can indicate the priority of services scheduled in the network relative to other services in the network.

As illustrated in FIG. 2B, a service for one SP of the network may have a different priority value compared to the same service for other SPs of the network. As such, the same service of the same service type provided by different SPs may be scheduled differently by the scheduler inside the network, e.g. the RAN. For example, the lower the priority value of a certain service of a certain type, the higher the priority may be for scheduling that service. In this respect, as illustrated in FIG. 2B, Service C Control Signalling has a lower priority value for SP2 than for SP1 and SP3, which means that Service C Control Signalling is scheduled earlier for SP2 than it is for SP1 and SP3. As illustrated by FIG. 2B, problems can arise due to the different QoS strategies of the SPs during deployment (e.g. "Problem #1", "Problem #2", and "Problem #3").

In Problem #1 of FIG. 2B, the user plane data flow for Service A of SP-1 is scheduled before the control signalling for Service B of SP-2 and SP-3. This is abnormal, since scheduling the control signalling of Service B for SP-2 and SP-3 is commonly more important than scheduling the data flow for Service A of SP-1. In Problem #2 of FIG. 2B, the user plane data flow of Service B for SP-1 is scheduled before the user plane data flow of Service B for SP-2 and SP-3, which may bring benefit to SP-1. In Problem #3 of FIG. 2B, similar to Problem #1, the user plane data flow of Service A for SP-2 is scheduled before the important control signalling of Service C for SP-1 and SP-3. The problems illustrated in FIG. 2B are basic illustrations and, in real scenarios, QoS strategies may be more complex.

QoS strategies that differ between SPs may lead to the same services provided by different SPs being scheduled at different priorities. This means that a particular SP may have a bandwidth and resource allocation advantage in the network (e.g. the RAN) over other SPs, even if those SPs all lease the same network slice. Moreover, an SP can adapt its QoS strategy if the SP gains knowledge of this potentially advantageous situation occurring in the network (e.g. RAN). Thus, an SP can use this scheduling behaviour to exploit the available resources in the network. This problem is likely to increase as the number of network slices in the network increases. In real deployment scenarios, it is important to provide fairness among network slices having the same priority but this is currently not possible.

Although SPs have the flexibility to prioritize network slices within the standard, given the data usage and coverage quality demands of users, it is unlikely that an SP will demand a lower priority network slice as the SP knows that it may then fall behind a competitor. Alternatively, there may be two SPs with the same network slice priority in an environment where many network slices are provided by the MIP. Furthermore, slow scheduling of a service provided by a first SP in a first network slice compared to the same service provided by a second SP in a second network slice can create a higher end-to-end delay for the service of the first SP. This latency can have a negative impact on user experience. If network slicing is configured in a way in which resources are shared in the network (e.g. the RAN), the service provided by a first SP may experience bandwidth problems as well as end-to-end delay. In this case, the first SP may no longer be able to provide the service as effectively as the second SP, which can potentially lead to congestion and unfairness between the SPs.

In order to handle this problem, SPs in a network (e.g. RAN) node may be forced to use the same QoS strategies for the network slices they lease from the same MIP. However, in this case, this may raise different problems. In particular, an SP may be required to lease network slices for different geographical locations from multiple MIPs or, in some geographical locations, an SP may have its own infrastructure. It is not reasonable to expect an SP to change its QoS strategy to receive services from the network slice provided by the MIP. One reason for this is that the SP is applying this specific QoS strategy throughout the rest of its network and the SP may be unwilling to make comprehensive updates to its network in light of the potential operational risks. Furthermore, it is likely that the SP developed the specific QoS strategy according to the SP's own experience over time and in line with customer demands.

FIG. 3 illustrates a problem that occurs when applying different QoS strategies within the same mobile network. As illustrated in FIG. 3, two different base stations ("Base Station-1" and "Base Station-2") in the network may have different QoS strategies ("QoS Strategy for Base Station-1" and "QoS Strategy for Base Station-2" respectively). An undesired deployment scenario may occur if a subscriber (e.g. a user equipment, UE) connected to a base station running in a first QoS strategy ("QoS strategy-1") moves and performs handover to another base station, which is running in a second QoS strategy ("QoS strategy-2").

For example, assume that a first user equipment ("UE-1") has an active connection for a particular service ("Service B"). UE-1 initiates a connection with Base Station-1 and has assigned a priority value of 4 for Service B. A second user equipment ("UE-2") initiates a connection with Base Station-2 and has assigned a priority value of 5 for Service B. Whenever UE-1 performs handover from Base Station-1 to Base Station-2, Service B for UE-1 is prioritized over Service B for UE-2. This situation provides a competitive advantage to UE-1 in providing Service B, over UE-2 providing the same Service B, in terms of bandwidth, radio resource usage, etc.

Similar problems to that illustrated in FIG. 3 can arise when an SP changes its QoS strategy to obey the QoS strategies of different MIPs, if the SP operates in a network with network slices leased from different MIPs. Moreover, some parts of an SP's network can be the SP's own infrastructure and some parts can be leased in network slices from MIPs. In each case, there may be a huge QoS deployment burden and optimization problem for the SP.

SUMMARY

It is an object of the disclosure to obviate or eliminate at least some of the above-described disadvantages associated with existing techniques.

Therefore, according to an aspect of the disclosure, there is provided a method for handling packets in a network. The method is performed by a first entity. The method is performed in response to receipt of a first packet, from a first network slice in the network, to be scheduled for a first service. A first priority value is assigned to the first packet by a provider of the first service. The method comprises setting a second priority value for the first packet based on a comparison of the first priority value with at least one reference priority value. The second priority value is indicative of a priority with which the first packet is to be scheduled relative to at least one other packet.

There is thus provided an advantageous method for handling packets in a network. In particular, the method allows packets, which may otherwise be scheduled in a network in an unfair manner, to be organised more effectively in the network according to set priority values. The method provides a unified priority value assignment for the packets in the network.

In some embodiments, the at least one reference priority value may comprise a first reference priority value previously assigned to the first service.

In some embodiments, the first reference priority value may be previously assigned to the first service by a second entity of a provider of the network.

In some embodiments, the method may comprise acquiring the first reference priority value from the second entity.

In some embodiments, the second priority value may be set as the first reference priority value if the first reference priority value is different to the first priority value or the second priority value may be set as the first priority value if the first reference priority value is the same as the first priority value.

In some embodiments, the at least one reference priority value may comprise at least one second reference priority value, wherein each second reference priority value may be assigned to one other packet that is to be scheduled and that may be received from one other network slice of the network.

In some embodiments, the one other packet may be scheduled for a second service, wherein the second service can be the same service as the first service or the same type of service as the first service.

In some embodiments, if the priority indicated by the first priority value is lower than a priority indicated by one or more of the at least one second reference priority values, the second priority value may be set as the second reference priority value of the one or more of the at least one second reference priority values that is indicative of the highest priority. In some embodiments, if the priority indicated by the first priority value is the highest of each priority indicated by the at least one second reference priority value, the second priority value may be set as the first priority value.

In some embodiments, the first packet may comprise data and/or control signalling for the first service.

According to another aspect of the disclosure, there is provided a first entity. The first entity comprises processing circuitry configured to operate in accordance with the method described earlier in respect of the first entity. The first entity thus provides the advantages discussed earlier in respect of the method performed by the first entity. In some embodiments, the first entity may comprise at least one memory for storing instructions which, when executed by the processing circuitry, cause the first entity to operate in accordance with the method described earlier in respect of the first entity. In some embodiments, the first entity may be an entity of a radio access network (RAN).

According to another aspect of the disclosure, there is provided a method for setting priority values for services in a network. The method is performed by a second entity of a provider of the network. The method comprises assigning a first reference priority value to a first service based on one or more priority values assigned to the first service by one or more providers of the first service. The first reference priority value is indicative of a priority with which the first packet is to be scheduled relative to at least one other packet.

There is thus provided an advantageous method for setting priority values for services in a network. In particular, the method allows packets, which may otherwise be scheduled in a network in an unfair manner, to be organised more effectively in the network according to set priority values. The method provides a unified priority value assignment for the packets in the network.

In some embodiments, the method may comprise acquiring, from one or more network function nodes of the one or more providers of the first service, the one or more priority values assigned to the first service.

In some embodiments, the method may comprise initiating transmission of the first reference priority value assigned to the first service towards a first entity for scheduling one or more packets of the first service.

In some embodiments, the method may comprise monitoring the one or more priority values assigned to the first service by the one or more providers of the first service.

In some embodiments, the method may comprise, in response to an update to the one or more priority values assigned to the first service by the one or more providers of the first service, assigning an updated first reference priority value to the first service based on the one or more updated priority values assigned to the first service by the one or more providers of the first service.

In some embodiments, the method may comprise initiating transmission of the updated first reference priority value assigned to the first service towards a first entity for scheduling one or more packets of the first service.

In some embodiments, the method may comprise creating a network slice in the network for the transmission of one or more packets to be scheduled for the first service.

According to another aspect of the disclosure, there is provided a second entity. The second entity comprises processing circuitry configured to operate in accordance with the method described earlier in respect of the second entity. The second entity thus provides the advantages discussed earlier in respect of the method performed by the second entity. In some embodiments, the second entity may comprise at least one memory for storing instructions which, when executed by the processing circuitry, cause the second entity to operate in accordance with the method described earlier in respect of the second entity.

According to another aspect of the disclosure, there is provided a method performed by a system. In some embodiments, the method may comprise the method described earlier in respect of the first entity, and/or the method described earlier in respect of the second entity. The method performed by the system thus provides the advantages discussed earlier in respect of the method performed by the first entity and/or second entity.

According to another aspect of the disclosure, there is provided a system. In some embodiments, the system may comprise at least one first entity as described earlier and/or at least one second entity as described earlier. The system thus provides the advantages discussed earlier in respect of the method performed by the first entity, and/or second entity.

According to another aspect of the disclosure, there is provided a computer program comprising instructions which, when executed by processing circuitry, cause the processing circuitry to perform the method described earlier in respect of the first entity and/or second entity. The computer program thus provides the advantages discussed earlier in respect of the method performed by the first entity and/or second entity.

According to another aspect of the disclosure, there is provided a computer program product, embodied on a non-transitory machine readable medium, comprising instructions which are executable by processing circuitry to cause the processing circuitry to perform the method described earlier in respect of the first entity and/or second entity. The computer program product thus provides the advantages discussed earlier in respect of the method performed by the first entity and/or second entity.

Therefore, advantageous techniques for handling packets in a network and setting priority values for services in the network are provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, advantageous techniques for handling packets in a network and setting priority values for services in a network, are described herein. Herein, a packet may be a network packet. The packet referred to herein may, for example, comprise control information (e.g. control signalling), data (e.g. user data, which may also be referred to as the payload), and/or similar.

Figure 1:
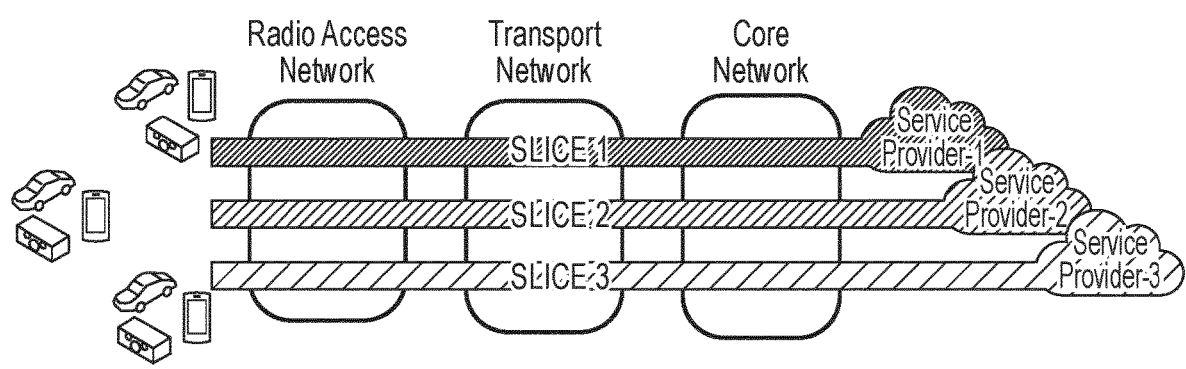
FIG. 1 is a block diagram illustrating an existing network architecture.
Figure 2A:
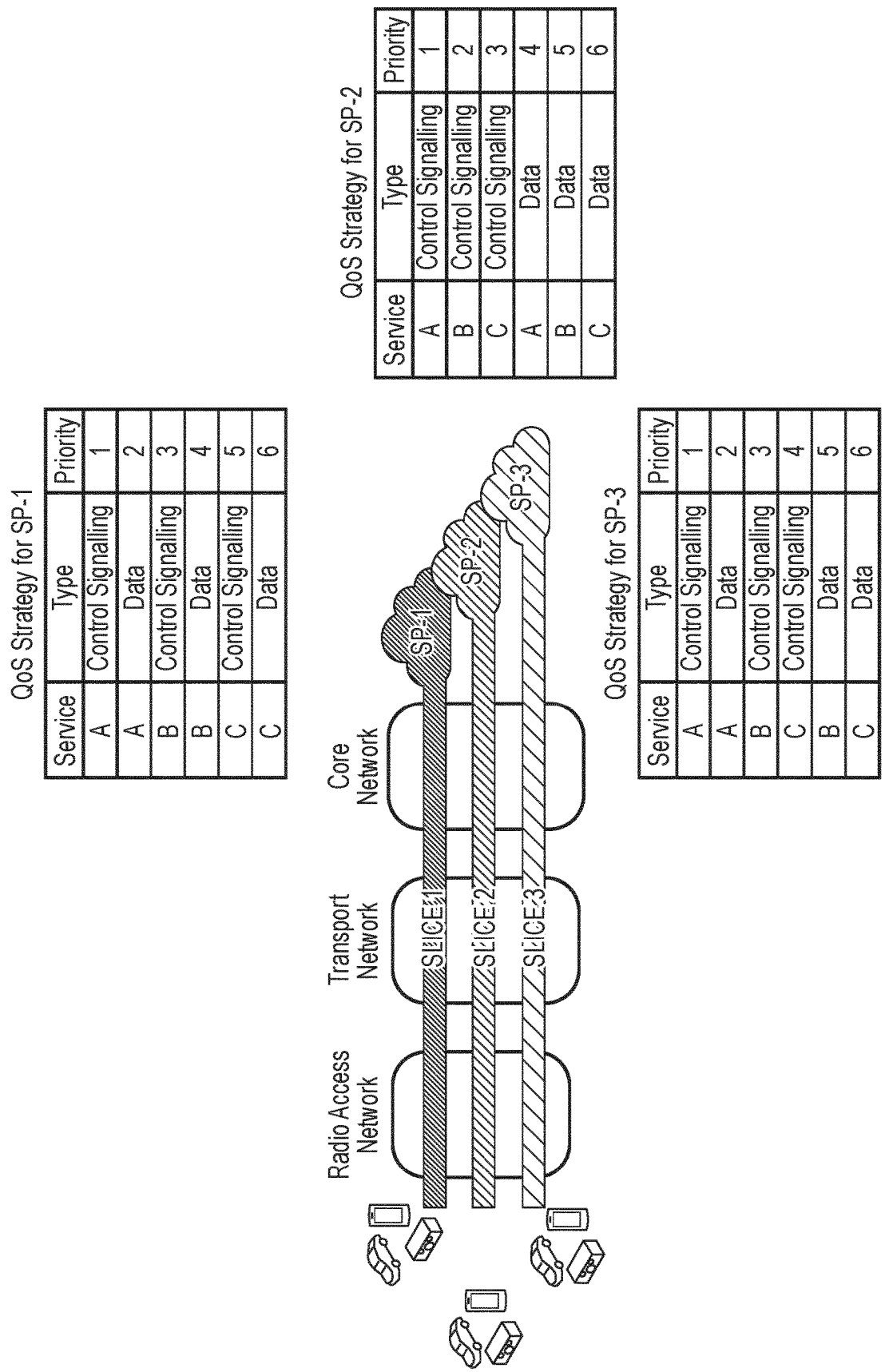
FIGS. 2A-B are block diagrams illustrating current problems.
Figure 2B:
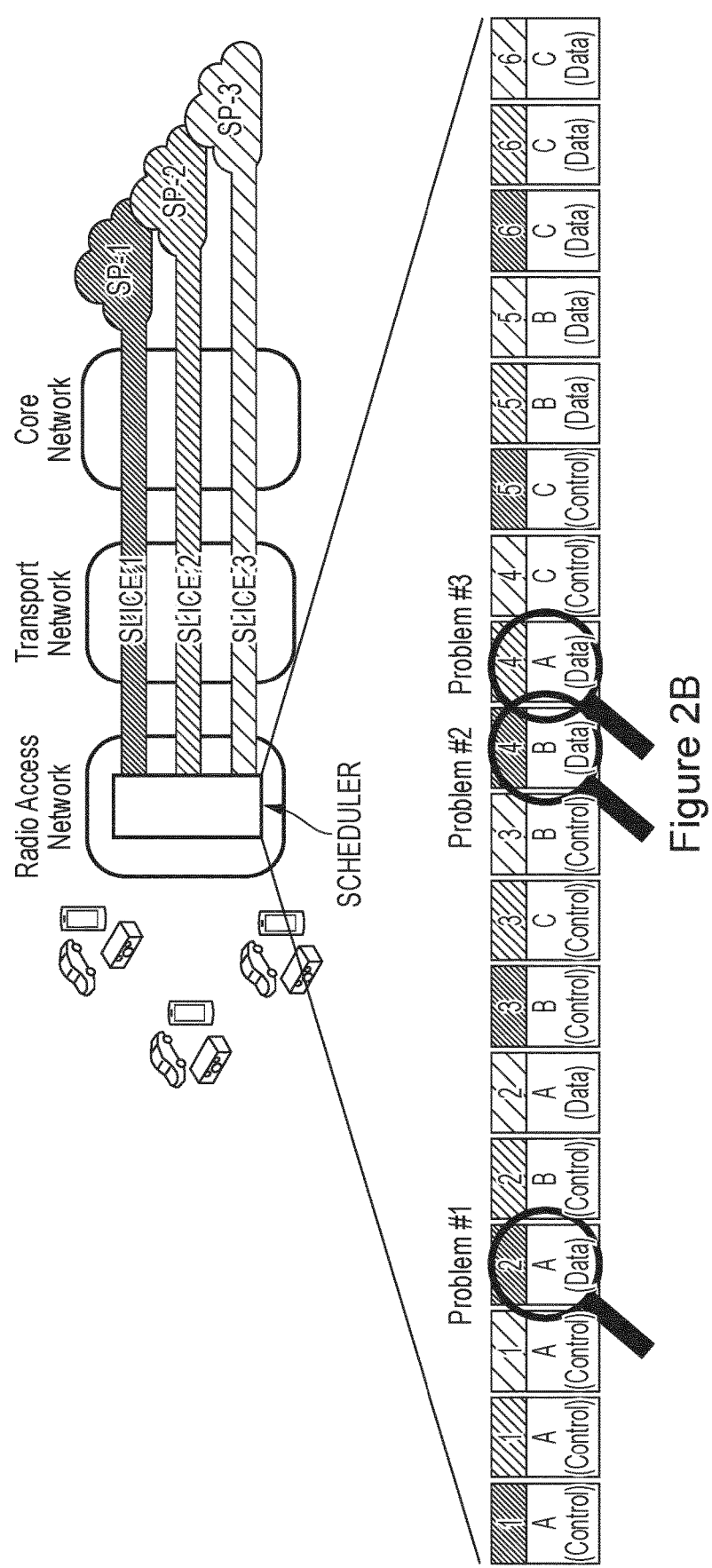
Figure 3:
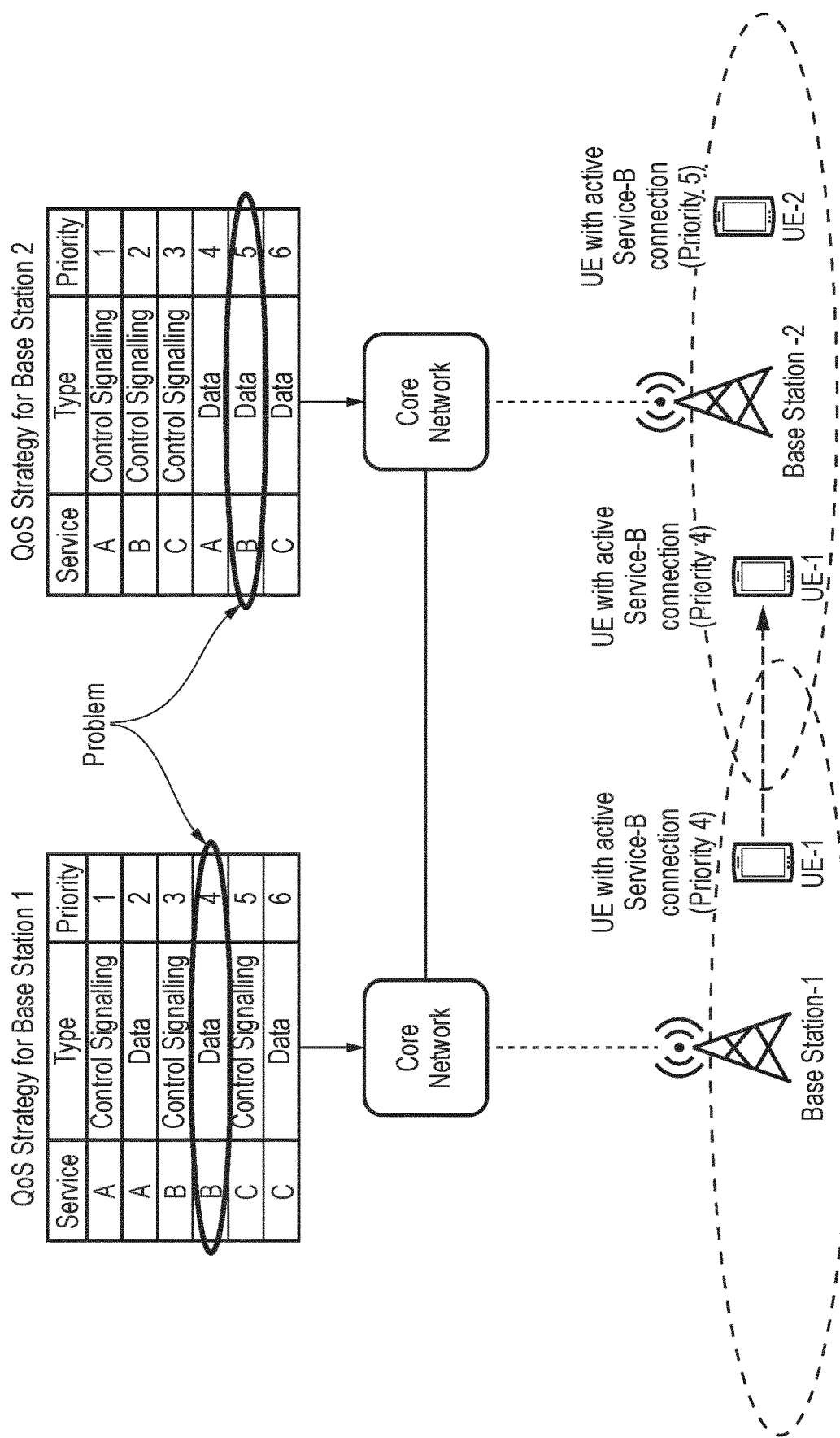
FIG. 3 is a block diagram illustrating a current problem.
Figures 4, 5:
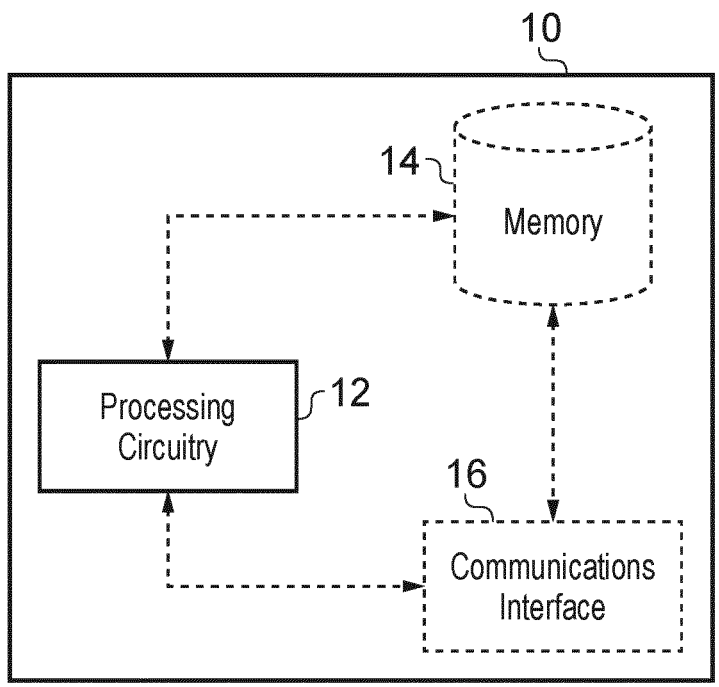
FIG. 4 is a block diagram illustrating a first entity according to an embodiment.
FIG. 5 is a flowchart illustrating a method performed by a first entity according to an embodiment.

FIG. 4 illustrates a first entity 10 in accordance with an embodiment. The first entity 10 is for handling packets in a network. The first entity 10 may, for example, be a physical machine (e.g. a server) or a virtual machine (VM). In some embodiments, the first entity 10 may be an entity of a radio access network (RAN). That is, a RAN may comprise the first entity 10. The first entity 10 may be an apparatus, e.g. inside a RAN, according to some embodiments. The first entity 10 referred to herein may also be referred to as a quality of service (QoS) organizer.

As illustrated in FIG. 4, the first entity 10 comprises processing circuitry (or logic) 12. The processing circuitry 12 controls the operation of the first entity 10 and can implement the method described herein in respect of the first entity 10. The processing circuitry 12 can be configured or programmed to control the first entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first entity 10. In some embodiments, the processing circuitry 12 can be configured to run software to perform the method described herein in respect of the first entity 10. The software may be containerised according to some embodiments. Thus, in some embodiments, the processing circuitry 12 may be configured to run a container to perform the method described herein in respect of the first entity 10.

Briefly, the processing circuitry 12 of the first entity 10 is configured to, in response to receipt of a first packet, from a first network slice in the network, to be scheduled for a first service, set a second priority value for the first packet based on a comparison of a first priority value with at least one reference priority value. The first priority value is assigned to the first packet by a provider of the first service. The second priority value is indicative of a priority with which the first packet is to be scheduled relative to at least one other packet.

A network slice can be defined as an (e.g. isolated, separate, or self-contained) end-to-end network. A network slice can be, for example, a portion of a physical network that connects two or more logical network interfaces or devices. A network slice may be implemented by reserving one or more functionalities along one or more network entities to provide an end-to-end service.

As illustrated in FIG. 4, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10. Alternatively or in addition, the memory 14 of the first entity 10 can be configured to store any information, data, messages, requests, responses, indications, notifications, signals, or similar, that are described herein. The processing circuitry 12 of the first entity 10 may be configured to control the memory 14 of the first entity 10 to store information, data, messages, requests, responses, indications, notifications, signals, or similar, that are described herein.

In some embodiments, as illustrated in FIG. 4, the first entity 10 may optionally comprise a communications interface 16. The communications interface 16 of the first entity 10 can be connected to the processing circuitry 12 of the first entity 10 and/or the memory 14 of first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with the second entity described herein, and/or any other entity. The communications interface 16 of the first entity 10 can be configured to transmit and/or receive information, data, messages, requests, responses, indications, notifications, signals, or similar, that are described herein. In some embodiments, the processing circuitry 12 of the first entity 10 may be configured to control the communications interface 16 of the first entity 10 to transmit and/or receive information, data, messages, requests, responses, indications, notifications, signals, or similar, that are described herein.

Although the first entity 10 is illustrated in FIG. 4 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 4 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 4 only shows the components required to illustrate an embodiment of the first entity 10 and, in practical implementations, the first entity 10 may comprise additional or alternative components to those shown.

FIG. 5 is a flowchart illustrating a method performed by a first entity 10 in accordance with an embodiment. The method is for handling packets in a network. The first entity 10 described earlier with reference to FIG. 4 is configured to operate in accordance with the method of FIG. 5. The method can be performed by or under the control of processing circuitry 12 of the first entity 10.

As illustrated at block 100 of FIG. 5, in response to receipt of a first packet, from a first network slice in the network, to be scheduled for a first service, a second priority value is set for the first packet based on a comparison of a first priority value with at least one reference priority value. More specifically, the processing circuitry 12 of the first entity 10 sets the second priority value for the first packet. The first priority value is assigned to the first packet by a provider of the first service. The second priority value is indicative of a priority value with which the first packet is to be scheduled relative to at least one other packet. This second priority value can allow services passing inside the network to be prioritised. This can be particularly advantageous where similar services are provided by different network slices. In some embodiments, each network slice may service a plurality of user equipments. Herein, a priority value can be considered to be a quality identifier (QI) value, such as a 5QI value in a 5G network embodiment.

In some embodiments, the at least one reference value may comprise a first reference value previously assigned to the first service. In some embodiments, the first reference priority value may be previously assigned to the first service by a second entity of a provider of the network. Although not illustrated in FIG. 5, in some embodiments, the method performed by the first entity 10 may comprise acquiring the first reference priority value from the second entity. More specifically, the processing circuitry 12 of the first entity 10 may be configured to acquire the first reference priority value from the second entity according to some embodiments.

In some embodiments, the second priority value may be set as the first reference priority value if the first reference priority value is different to the first priority value, or the second priority value may be set as the first priority value if the first reference priority value is the same as the first priority value. In some embodiments, the at least one reference priority value may comprise at least one second reference priority value, wherein each second reference priority value is assigned to one other packet that is to be scheduled and that is received from one other network slice of the network. In some embodiments, the one other packet may be scheduled for a second service, wherein the second service is the same service as the first service or the same type of service as the first service.

In some embodiments, if the priority indicated by the first priority value is lower than a priority indicated by one or more of the at least one second reference priority values, the second priority value may be set as the second reference priority value of the one or more of the at least one second reference priority values that is indicative of the highest priority. In some embodiments, if the priority indicated by the first priority value is the highest of each priority indicated by the at least one second reference priority value, the second priority value may be set as the first priority value.

In some embodiments, the first packet referred to herein may comprise data (e.g. user data) and/or control information (e.g. control signalling) for the first service.

Figures 6, 7:
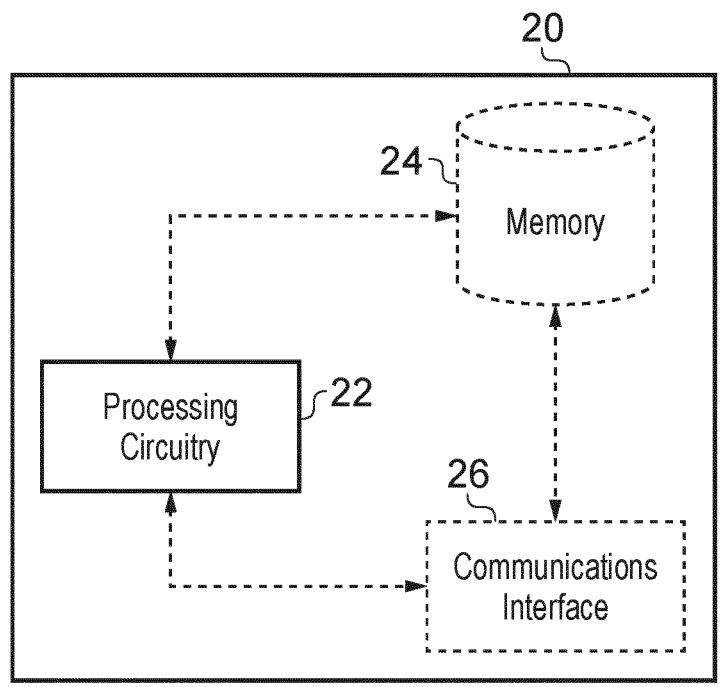
FIG. 6 is a block diagram illustrating a second entity according to an embodiment.
FIG. 7 is a flowchart illustrating a method performed by a second entity according to an embodiment.

FIG. 6 illustrates a second entity 20 of a provider of a network in accordance with an embodiment. The second entity 20 is for setting priority values for services in the network. The second entity 20 may, for example, be a physical machine (e.g. a server) or a virtual machine (VM). In some embodiments, the second entity 20 may be an orchestrator or, more specifically, a network orchestrator. In some embodiments, the provider of the network may be a mobile infrastructure provider (MIP).

As illustrated in FIG. 6, the second entity 20 comprises processing circuitry (or logic) 22. The processing circuitry 22 controls the operation of the second entity 20 and can implement the method described herein in respect of the second entity 20. The processing circuitry 22 can be configured or programmed to control the second entity 20 in the manner described herein. The processing circuitry 22 can comprise one or more hardware components, such as one or more processors, one or more processing units, one or more multi-core processors, and/or one or more modules. In particular implementations, each of the one or more hardware components can be configured to perform, or is for performing, individual or multiple steps of the method described herein in respect of the second entity 20. In some embodiments, the processing circuitry 22 can be configured to run software to perform the method described herein in respect of the second entity 20. The software may be containerised according to some embodiments. Thus, in some embodiments, the processing circuitry 22 may be configured to run a container to perform the method described herein in respect of the second entity 20.

Briefly, the processing circuitry 22 of the second entity 20 is configured to, assign a first reference priority value to a first service based on one or more priority values assigned to the first service by one or more providers of the first service. The first reference priority value is indicative of a priority with which the first packet is to be scheduled relative to at least one other packet.

As illustrated in FIG. 6, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any information, data, messages, requests, responses, indications, notifications, signals, or similar, that are described herein. The processing circuitry 22 of the second entity 20 may be configured to control the memory 24 of the second entity 20 to store information, data, messages, requests, responses, indications, notifications, signals, or similar, that are described herein.

In some embodiments, as illustrated in FIG. 6, the second entity 20 may optionally comprise a communications interface 26. The communications interface 26 of the second entity 20 can be connected to the processing circuitry 22 of the second entity 20 and/or the memory 24 of second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with the first entity 10 described herein, and/or any other entity. The communications interface 26 of the second entity 20 can be configured to transmit and/or receive information, data, messages, requests, responses, indications, notifications, signals, or similar, that are described herein. In some embodiments, the processing circuitry 22 of the second entity 20 may be configured to control the communications interface 26 of the second entity 20 to transmit and/or receive information, data, messages, requests, responses, indications, notifications, signals, or similar, that are described herein.

Although the second entity 20 is illustrated in FIG. 6 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 6 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 6 only shows the components required to illustrate an embodiment of the second entity 20 and, in practical implementations, the second entity 20 may comprise additional or alternative components to those shown.

FIG. 7 is a flow chart illustrating a method performed by a second entity 20 of a provider of a network in accordance with an embodiment. The method is for setting priority values for services in the network. The second entity 20 described earlier with reference to FIG. 6 is configured to operate in accordance with the method of FIG. 7. The method can be performed by or under the control of the processing circuitry 22 of the second entity 20.

As illustrated at block 200 of FIG. 7, a first reference priority value is assigned to a first service based on one or more priority values assigned to the first service by one or more providers of the first service. More specifically, the processing circuitry 22 of the second entity 20 assigns the first reference priority value to the first service. The first reference priority value is indicative of a priority with which the first packet is to be scheduled relative to at least one other packet.

Although not illustrated in FIG. 7, in some embodiments, the method may comprise acquiring, from one or more network function nodes of the one or more providers of the first service, the one or more priority values assigned to the first service. More specifically, the processing circuitry 22 of the second entity 20 can be configured to acquire the one or more priority values assigned to the first service according to some embodiments.

Although also not illustrated in FIG. 7, in some embodiments, the method may comprise initiating transmission of the first reference priority value assigned to the first service towards a first entity 10 for scheduling one or more packets of the first service. More specifically, the processing circuitry 22 of the second entity 20 can be configured to initiate transmission of the first reference priority value towards the first entity 10 according to some embodiments. Herein, the term "initiate" can mean, for example, cause or establish. Thus, the processing circuitry 12 of the first entity 10 can be configured to itself transmit the first reference priority value towards the first entity 10 (e.g. via a communications interface 16 of the first entity 10) or can be configured to cause another entity/node to transmit the first reference priority value towards the first entity 10.

Although also not illustrated in FIG. 7, in some embodiments, the method may comprise monitoring the one or more priority values assigned to the first service by the one or more providers of the first service. More specifically, the processing circuitry 22 of the second entity 20 can be configured to monitor the one or more priority values assigned to the first service according to some embodiments.

Although also not illustrated in FIG. 7, in some embodiments, the method may comprise, in response to an update to the one or more priority values assigned to the first service by the one or more providers of the first service, assigning an updated first reference priority value to the first service based on the one or more updated priority values assigned to the first service by the one or more providers of the first service. More specifically, the processing circuitry 22 of the second entity 20 can be configured to assign the updated first reference priority value to the first service according to some embodiments. In this way, the first entity can keep up with any updates to the assigned reference priority value.

Although also not illustrated in FIG. 7, in some embodiments, the method comprise initiating transmission of the updated first reference priority value assigned to the first service towards a first entity 10 for scheduling one or more packets of the first service. More specifically, the processing circuitry 22 of the second entity 20 can be configured to initiate transmission of (e.g. itself transmit, such as via a communications interface 26 of the second entity 20, or cause another entity/node to transmit) the updated first reference priority value towards a first entity 10 according to some embodiments.

Although also not illustrated in FIG. 7, in some embodiments, the method comprise creating a network slice in the network for the transmission of one or more packets to be scheduled for the first service. More specifically, the processing circuitry 22 of the second entity 20 can be configured to create the network slice according to some embodiments. In other embodiments, the network slice may already have been created in the network. That is, the network slice may be a pre-existing network slice.

There is also provided a system. The system is for handling packets in a network and/or setting priority values for services in the network. The system can comprise at least one first entity 10 as described herein and/or at least one second entity 20 described herein. A method performed by the system can thus comprise the method described herein in respect of the first entity 10 and/or the method described herein in respect of the second entity 20.

Figure 8:
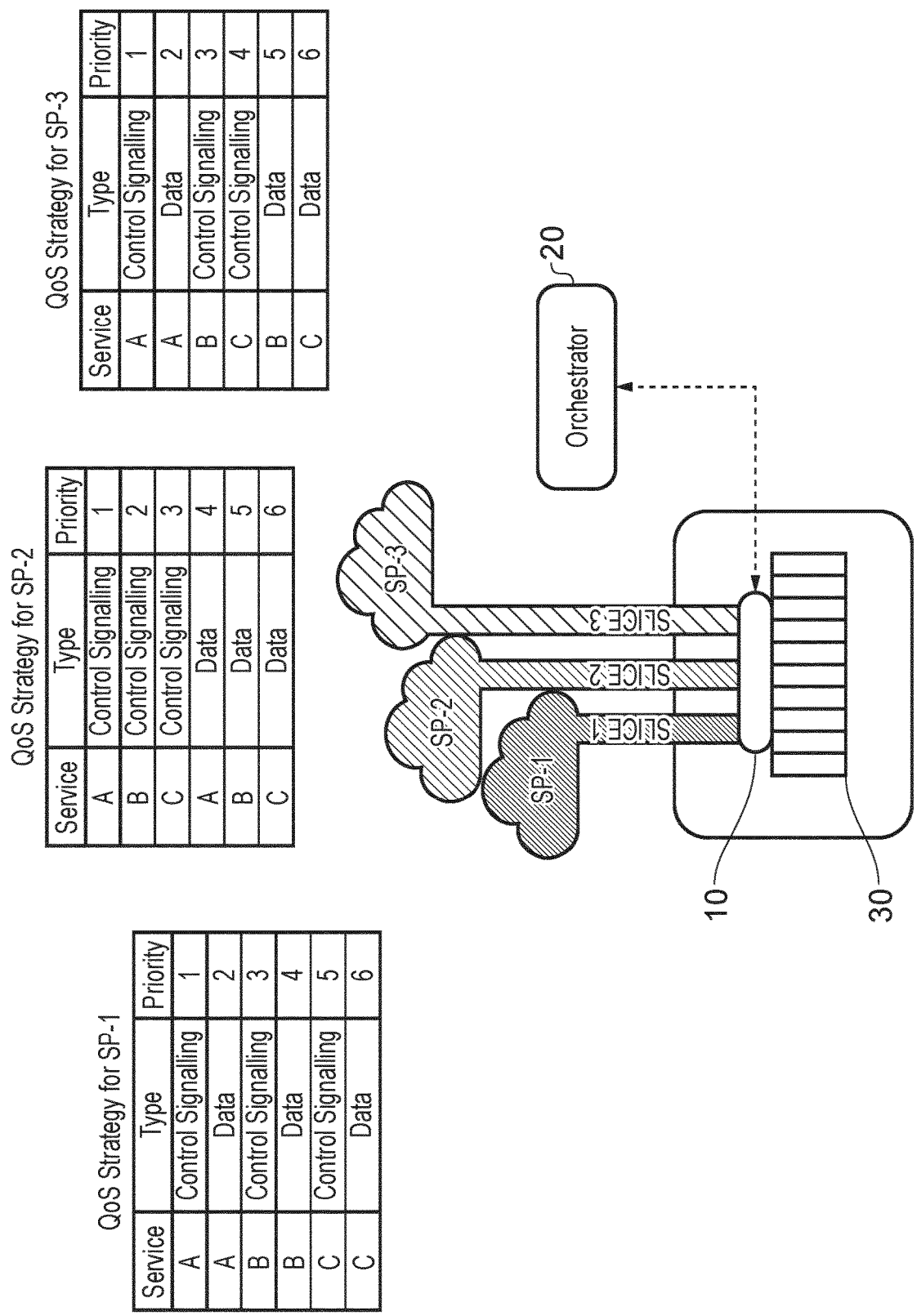
FIG. 8 is a block diagram illustrating a system according to an embodiment.

FIG. 8 is a block diagram illustrating a system in accordance with an embodiment. The system illustrated in FIG. 8 comprises a first entity 10 as described earlier and a second entity (e.g. an orchestrator) 20 as described earlier. As illustrated in FIG. 8, in some embodiments, the system may comprise a third entity 30. The third entity 30 can be for scheduling services from at least one network slice of the network. For example, the third entity 30 can be a scheduler according to some embodiments. The first entity 10 can communicate with the second entity 20. As illustrated in FIG. 8, the first entity 10 can be positioned before the third entity 30. In some embodiments, the first entity 10 may be activated and/or deactivated by the second entity 20.

The system illustrated in FIG. 8 also comprises a network. The network is sliced into a plurality of slices. In the embodiment illustrated in FIG. 8, the network comprises three network slices. However, it will be understood that the network referred to herein may comprise any other number of network slices. In the embodiment illustrated in FIG. 8, a first network slice ("SLICE 1") is dedicated to a first service provider ("SP-1"), a second network slice ("SLICE 2") is dedicated to a second service provider ("SP-2"), and a third network slice ("SLICE 3") is dedicated to a third service provider ("SP-3"). The embodiment illustrated in FIG. 8 is directed to a horizontally sliced network. However, it will be understood that the system may instead comprise a vertically sliced network according to other embodiments. In these other embodiments, the service providers may create their own infrastructure.

In some embodiments, the first entity 10 may have the responsibility for organising traffic from the different network slices according to their QoS values. As illustrated in FIG. 8, each service provider has its own QoS strategy for each service. In the embodiment illustrated in FIG. 8, the QoS strategies each comprise a service name, a service type and a first priority value.

In the system illustrated in FIG. 8, the first entity 10 operates in the manner described earlier with reference to FIGS. 4 and 5. The second entity 20 operates in the manner described earlier with reference to FIGS. 6 and 7. Thus, briefly, the second entity 20 assigns the first reference priority value to the first service and the first entity 10 sets the second priority value for the first packet. In some embodiments, the first entity 10 (or, more specifically, the processing circuitry 12 of the first entity 10) may initiate transmission of (e.g. itself transmit, such as via a communications interface 16 of the first entity 10, or cause another entity/node to transmit) the second priority value set for the first packet towards the third entity 30. In embodiments where the third entity 30 is a scheduler the third entity 30 (or, more specifically, processing circuitry of the third entity) may schedule the first packet according to the second priority value set for the first packet.

Although the method has been described herein in respect of a first packet, from a first network slice in the network, to be scheduled for a first service, it will be understood that the method can be performed for any other packet (and any number of packets, e.g. a single packet or a plurality of packets), from any network slice (and any number of network slices, e.g. a single network slice or a plurality of network slices), to be scheduled for any service (and any number of services, e.g. a single service or a plurality of services).

Figure 9A:
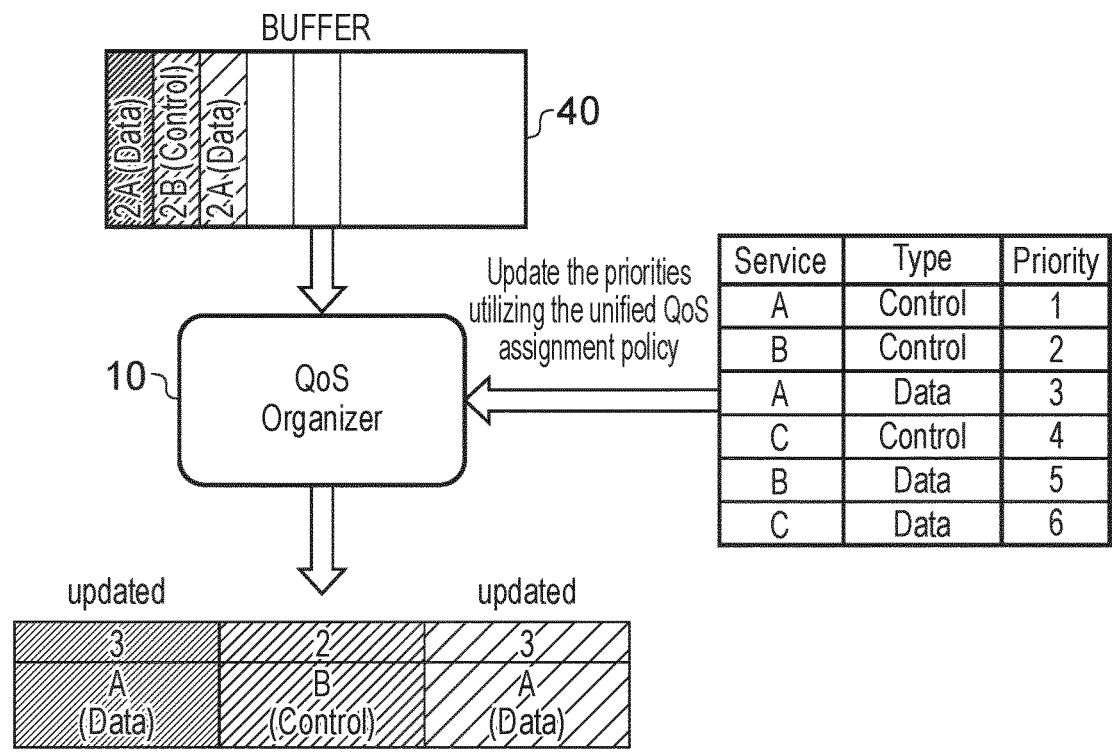
FIGS. 9A-B are block diagrams illustrating systems according to some embodiments.
Figure 9B:
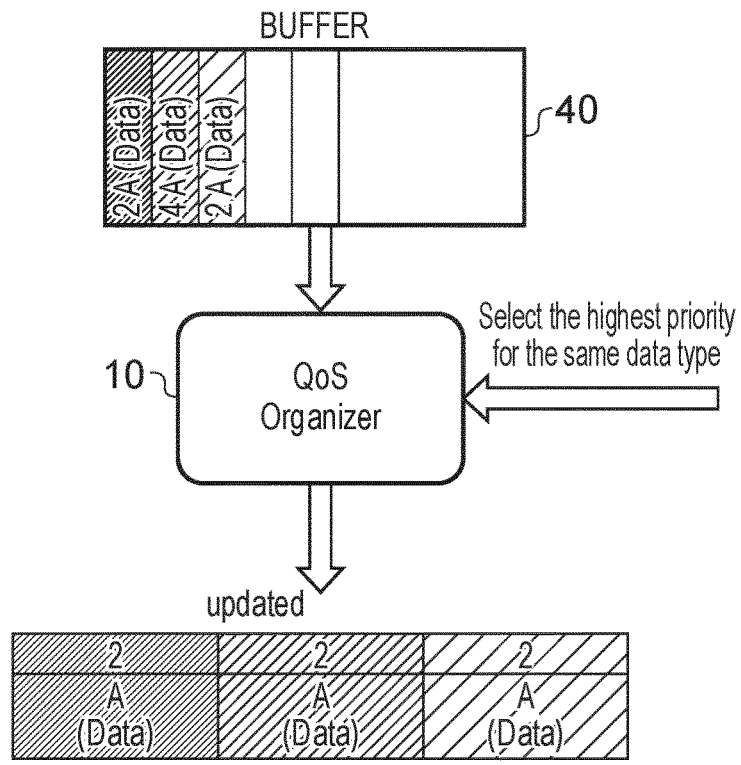

FIGS. 9A and 9B are block diagrams illustrating a system in operation according to some embodiments. The system illustrated in FIGS. 9A and 9B may be as described earlier with reference to FIG. 8. As illustrated in FIGS. 9A and 9B, the system comprises a first entity ("QoS Organizer") 10. The first entity 10 can be configured to operate in the manner described earlier. In some embodiments, as illustrated in FIGS. 9A and 9B, the system may comprise a fourth entity (e.g. a buffer or packet buffer, which may be a memory) 40.

The fourth entity 40 may be configured to hold (e.g. store) at least one packet, from at least one network slice in the network, to be scheduled for at least one service. The at least one packet may be at least one packet awaiting transmission over the network. The at least one packet received at the fourth entity 40 can be accessible by the first entity 10. In some embodiments, the method performed herein in respect of the first entity 10 can be performed in response to receipt of at least one packet at the fourth entity 40. For example, the method performed herein in respect of the first entity 10 can be performed in response to receipt, at the fourth entity 40, of the first packet referred to herein to be scheduled for the first service referred to herein. In some embodiments, the first entity 10 (or, more specifically, the processing circuitry 12 of the first entity 10) can be configured to detect the first packet at the fourth entity 40, such as by detecting packets from different network slices at the fourth entity 40. For example, the first entity 10 (or, more specifically, the processing circuitry 12 of the first entity 10) may be configured to check the packets that are received at the fourth entity 40 in order to detect the first packet.

As described earlier, a first priority value is assigned to the first packet by a provider of the first service. In some embodiments, each packet received at the fourth entity 40 may have a corresponding priority value assigned to it by a provider of the service in respect of which that packet is to be scheduled.

Although FIGS. 9A and 9B illustrate an embodiment in which at least one packet may be received at the fourth entity 40, in other embodiments, the at least one packet may instead be received by the first entity 10 itself. Also, although the fourth entity 40 is illustrated as being external to (e.g. separate or remote from) the first entity 10 in the embodiment of FIGS. 9A and 9B, in other embodiments, the first entity 10 may comprise the fourth entity 40.

In the embodiments illustrated in FIGS. 9A and 9B, in response to receipt of the first packet, from the first network slice in the network, to be scheduled for the first service, the first entity 10 (or, more specifically, the processing circuitry 12 of the first entity 10) sets a second priority value for the first packet based on a comparison of the first priority value with at least one reference priority value. As described earlier, the second priority value is indicative of a priority with which the first packet is to be scheduled relative to at least one other packet.

In the embodiment illustrated in FIG. 9A, the at least one reference priority value comprises a first reference priority value previously assigned to the first service, e.g. by a second entity 20 of a provider (or operator) of the network. This first reference priority value can be assigned by the provider (or operator) of the network to manage the services that are provided. The first reference priority value can, for example, provide the flexibility to prioritise some types of service. Although not specifically illustrated in FIG. 9A, the second entity 20 (or, more specifically, the processing circuitry 22 of the second entity 20) of a provider of the network assigns the first reference priority value to the first service based on one or more priority values assigned to the first service by one or more providers of the first service, in the manner described earlier. In some embodiments, the second entity 20 (or, more specifically, the processing circuitry 22 of the second entity 20) of the provider of the network may also assign at least one other reference priority value to at least one other service based on one or more priority values assigned to the at least one other service by one or more providers of the at least one other service, in the manner described earlier.

In some embodiments, as illustrated in FIG. 9A, an assignment policy (e.g. in the form of a table) may comprise the first reference priority value and information identifying the first service to which it is assigned, and optionally also at least one other reference priority value and information identifying the service to which the at least one other reference priority value is assigned. For each reference priority value, the information identifying the service to which the reference priority value is assigned may, for example, comprise a name of the service (e.g. "A", "B", "C", etc.) and/or a type of the service (e.g. "Control", "Data", etc.). In some embodiments, such as that illustrated in FIG. 9A, the lower the reference priority value, the higher the priority is for scheduling the corresponding packet for the service to which the reference priority value is assigned. The reference priority value and the information identifying the service to which the reference priority value is assigned can be referred to herein as a profile of the service or the service profile. This profile can be specific to a network slice created for a service provider of that service.

In some embodiments, the assignment policy referred to herein can be based on a quality of service (QoS) strategy of each service provider, which can comprise a priority value for each service provided by that service provider. As such, the assignment policy may be referred to as a "unified QoS assignment policy". In some embodiments, the second entity 20 (or, more specifically, the processing circuitry 22 of the second entity 20) can be configured to acquire the QoS strategy of each service provider for the purpose of creating the assignment policy. That is, the second entity 20 (or, more specifically, the processing circuitry 22 of the second entity 20) can be configured to acquire the profiles of the services ("service profiles") provided by each service provider. The second entity thus has the QoS strategies of different services. The QoS strategy of each service provider can, for example, be acquired from (e.g. the core network of) the service provider. This acquisition may be performed manually or through an interface, e.g. a representational state transfer application programming interface (REST API). In some embodiments, the second entity 20 (or, more specifically, the processing circuitry 22 of the second entity 20) may monitor the QoS strategies, e.g. periodically, in case any of the QoS strategies are updated. The service providers themselves may already be aware of the QoS strategy of other service providers as they may share their QoS strategies with each other.

If the QoS strategies of the service providers each comprise the same priority value for a particular service, the reference priority value for that service may be assigned as that same priority value. On the other hand, if any of the QoS strategies of the service providers comprise different priority values for a particular service, a common reference priority value is assigned to that service. A person skilled in the art will be aware of the manner in which a common reference priority value may be assigned to the service. For example, a provider (or operator) of the network may assign the common reference priority value to the service. The assignment may be performed to ensure that the services are scheduled in a fair manner. The assignment may be performed in conformity with the third generation partnership project (3GPP). In this way, for each service, all service providers are assigned the same priority value for a particular service. Thus, the assignment policy is created by the second entity 20.

In other embodiments, the first entity 10 (or, more specifically, the processing circuitry 12 of the first entity 10) may be configured to create the assignment policy in the manner described herein. In these embodiments, the second entity 20 (or more specifically, the processing circuitry 22 of the second entity 20) can be configured to initiate transmission of (e.g. itself transmit, via a communications interface 26 of the second entity 20, or cause another entity/node to transmit) the QoS strategy of each service provider to the first entity 10. Thus, in some embodiments, the first entity 10 (or, more specifically, the processing circuitry 12 of the first entity 10) may be configured to perform the method described herein in respect of the second entity 20 for assigning a first reference priority value to a first service based on one or more priority values assigned to the first service by one or more providers of the first service.

In some embodiments, the assignment of the first reference priority value to the first service may be performed when a network slice is created for the service provider of the first service. In some embodiments, the second entity 20 can be configured to create this network slice or the network slice may already have been created, i.e. the network slice may be a pre-existing network slice. The QoS strategy of the service provider can be associated with the network slice created for the service provider.

In the embodiment illustrated in FIG. 9A, the first entity 10 (or, more specifically, the processing circuitry 12 of the first entity 10) sets a second priority value for the first packet to be scheduled for the first service based on a comparison of the first priority value assigned to the first packet with the first reference priority value previously assigned to the first service, e.g. in the assignment policy. As illustrated by FIG. 9A, the second priority value for the first packet is set as the first reference priority value if the first reference priority value is different to the first priority value of the packet. For example, with reference to FIG. 9A, the first packet for the first service "A (Data)" received at the fourth entity 40 has a first priority value of 2, whereas the first reference value assigned to the first service "A (Data)" is 3 (according to the "unified QoS assignment policy" table). Therefore, since the first priority value and the first reference priority value are different, the first entity 10 (or, more specifically, the processing circuitry 12 of the first entity 10) sets the second priority value as the first reference value (i.e. 3) as shown below the first entity 10. Thus, in this case, there is an update to (or translation of) the priority value assigned to the first packet. The first entity 10 has the capability to change the priority value assigned to the first packet, e.g. such that any unfair scheduling situation and/or the problems mentioned earlier can be resolved. This overriding capability can thus aid in handling (e.g. the same type of) services in a fair way.

On the other hand, as also illustrated in FIG. 9A, the second priority value is set as the first priority value if the first reference priority value is the same as the first priority value. For example, with reference to FIG. 9A, the first packet for the first service "B (Control)" received at the fourth entity 40 has the same first priority value as the first reference priority value of 2 (according to the "unified QoS assignment policy" table). Therefore, since the first priority value and the first reference priority value are the same, the first entity 10 (or, more specifically, the processing circuitry 12 of the first entity 10) sets the second priority value as the first priority value (i.e. 2), as shown below the first entity 10. Thus, in this case, there is no update to (or translation of) the priority value assigned to the first packet. The first priority value assigned to the first packet by a provider of the first service is considered and, in this case, obeyed.

In the embodiment illustrated in FIG. 9B, the at least one reference priority value comprises at least one second reference priority value, where each second reference priority value is assigned to one other packet that is to be scheduled and that is received (e.g. at the fourth entity 40) from one other network slice of the network. The one other packet may be a packet that is to be scheduled for a second service. In some embodiments, the second service may be the same service as the first service or the same type of service as the first service. In some embodiments, such as that illustrated in FIG. 9B, the lower the reference priority value, the higher the priority is for scheduling the corresponding packet for the service to which the reference priority value is assigned.

As illustrated in FIG. 9B, if the priority indicated by the first priority value is the highest of each priority indicated by the at least one second reference priority value, the second priority value is set as the first priority value. For example, with reference to FIG. 9B, the priority indicated by the first priority value assigned to the first packet (which, for the purpose of this example, is the first packet received at the fourth entity 40) to be scheduled for the first service "A (Data)" is 2, whereas the reference priority values assigned to the other packets to be scheduled for the first service "A (Data)" are 4 and 2 respectively. As the priority indicated by the first priority value of 2 is the highest of each priority indicated by the reference priority values, the second priority value is set as the reference priority value that is indicative of the highest priority, i.e. the second priority value is set to 2. Thus, in this case, there is no update to (or translation of) the priority value assigned to the first packet. The first priority value assigned to the first packet by a provider of the first service is considered and, in this case, obeyed.

On the other hand, as also illustrated in FIG. 9B, if the priority indicated by the first priority value is lower than a priority indicated by one or more of the at least one second reference priority values, the second priority value is set as the second reference priority value of the one or more of the at least one second reference priority values that is indicative of the highest priority. In some embodiments, for example, the first entity 10 (or, more specifically, the processing circuitry 12 of the first entity 10) sets the second priority value for the first packet as the reference priority value indicating the highest priority of any other packet received at the fourth entity 40. For example, with reference to FIG. 9B, the priority indicated by the first priority value assigned to the first packet (which, for the purpose of this example, is the second packet received at the fourth entity 40) to be scheduled for the first service "A (Data)" is 4, whereas the reference priority values assigned to the other packets to be scheduled for the first service "A (Data)" are all 2. As the priority indicated by the first priority value of 4 is lower than the priority indicated by the reference priority value of 2, the second priority value is set as the reference priority value that is indicative of the highest priority, i.e. the second priority value is set to 2. Thus, in this case, there is an update to (or translation of) the priority value assigned to the first packet. The first entity has the capability to change the priority value assigned to the first packet, e.g. such that any unfair scheduling situation and/or the problems mentioned earlier can be resolved. This overriding capability can thus aid in handling (e.g. the same type of) services in a fair way.

In the embodiments illustrated in FIGS. 9A and 9B, once the second priority value has been set for the first packet, the first entity (or, more specifically, the processing circuitry 12 of the first entity 10) can be configured to initiate transmission of (e.g. itself transmit, such as via a communications interface 16 of the first entity 10, or cause another entity/node to transmit) the first packet to a third entity (e.g. scheduler) 30, which is not illustrated in FIGS. 9A and 9B but can be as described earlier with reference to FIG. 8. In the cases where there is no update to (or translation of) the priority value assigned to the first packet, the first entity 10 can effectively bypass the first packet and it can be sent directly to the third entity 30.

The setting of the second priority value for the first packet, as illustrated by the embodiments of FIGS. 9A and 9B, can be performed in the same first entity 10, i.e. the same network node. As such, a connection of the user plane (UP) flow of the first service can be kept as in an original assignment at the level of the network function (e.g. an access and mobility management function (AMF), session management function (SMF), user plane function (UPF)) of the service provider. Any update to (or translation of) the priority value assigned to the first packet is only at a network node (e.g. 5G NR node) level and not at the level of the network function (e.g. AMF, SMF, UPF) of the service provider. In case of handovers from one network to another, the update does not create a problem.

Figure 10:
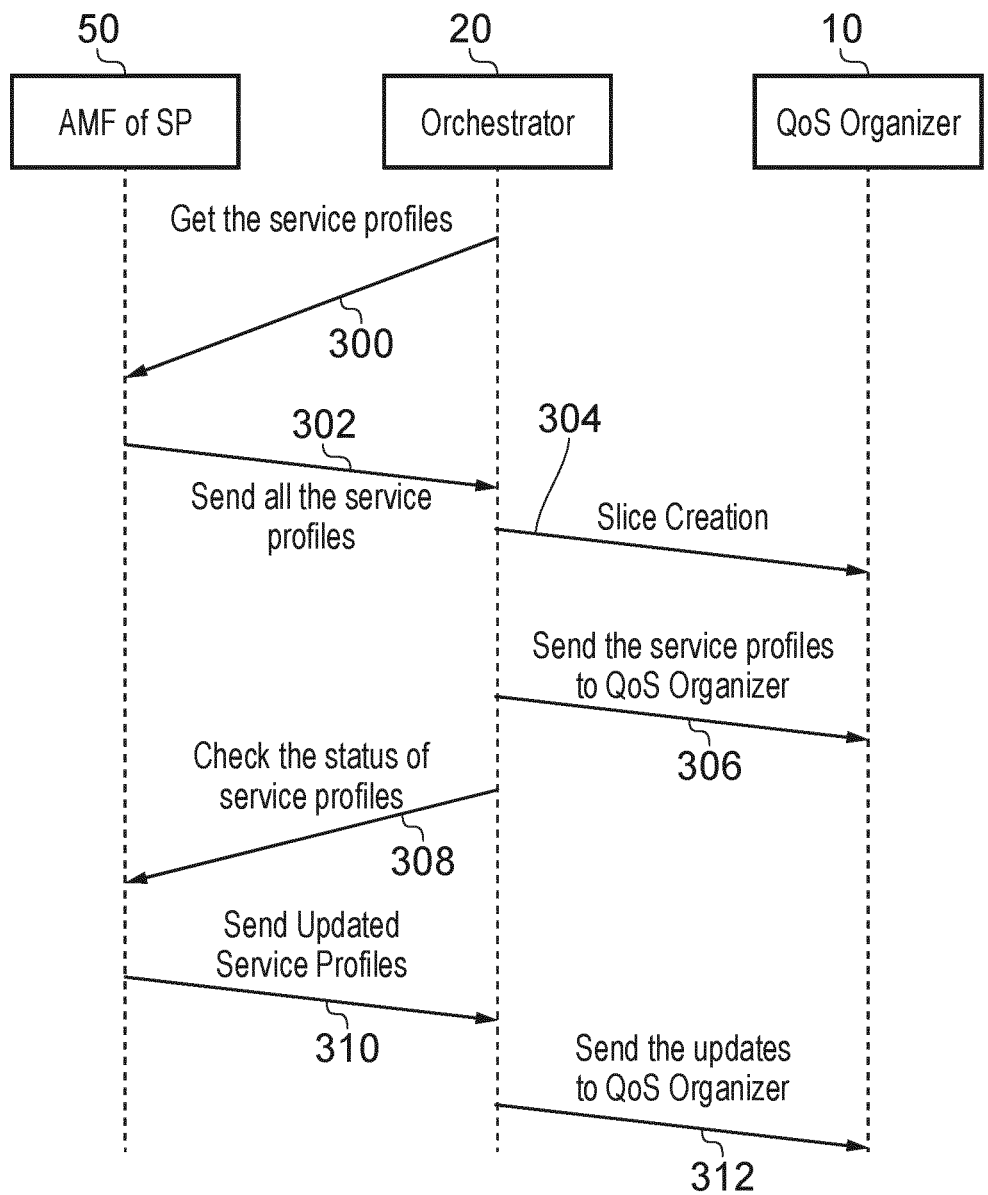
FIG. 10 is a signalling diagram illustrating an exchange of signals in a system according to an embodiment.

FIG. 10 is a signalling (or call flow) diagram illustrating an exchange of signals in a system according to an embodiment. The system may be as illustrated in FIG. 8, 9A or 9B according to some embodiments. The system illustrated in FIG. 10 comprises a first entity (or QoS organizer) 10 as described earlier and a second entity (e.g. an orchestrator) 20 as described earlier. The system illustrated in FIG. 10 also comprises a fifth entity 50. In some embodiments, the fifth entity 50 may be a network function node of a service provider such as, but not limited to, an AMF node, an SMF node or a UPF node.

In some embodiments, as illustrated at arrow 300 of FIG. 10, the second entity 20 may acquire the QoS strategy of each service provider for the purpose of creating the assignment policy as described earlier. For example, for each service provider, the second entity 20 can request the service profiles from the fifth entity 50 of the service provider. As illustrated by arrow 302 of FIG. 10, the fifth entity 50 of the service provider can transmit the service profiles to the second entity 20. Thus, the second entity 20 can acquire the service profiles from the fifth entity 50 of the service provider in this way according to some embodiments.

As illustrated by arrow 304 of FIG. 10, in some embodiments, the second entity 20 may create network slices in the network and informs the first entity 10 accordingly. As illustrated by arrow 306 of FIG. 10, the second entity 20 may transmit the acquired service profiles to the first entity 10. Thus, in some embodiments, such as that illustrated in FIG. 10, the first entity 10 can create the assignment policy as described earlier. Although not illustrated in FIG. 10, the first entity 10 also sets the priority values for packets in the manner described earlier.

As illustrated by arrow 308 of FIG. 10, in some embodiments, the second entity 20 may check the status of the acquired service profiles with the fifth entity 50 of the service provider. In some embodiments, as illustrated by arrow 310 of FIG. 10, the fifth entity 50 of the service provider may transmit updated service profiles to the second entity 20. Thus, the second entity 20 can acquire the updated service profiles from the fifth entity 50 of the service provider in this way according to some embodiments. In some embodiments, as illustrated by arrow 312 of FIG. 10, the second entity 20 may send the updates to the first entity 10.

Figure 11:
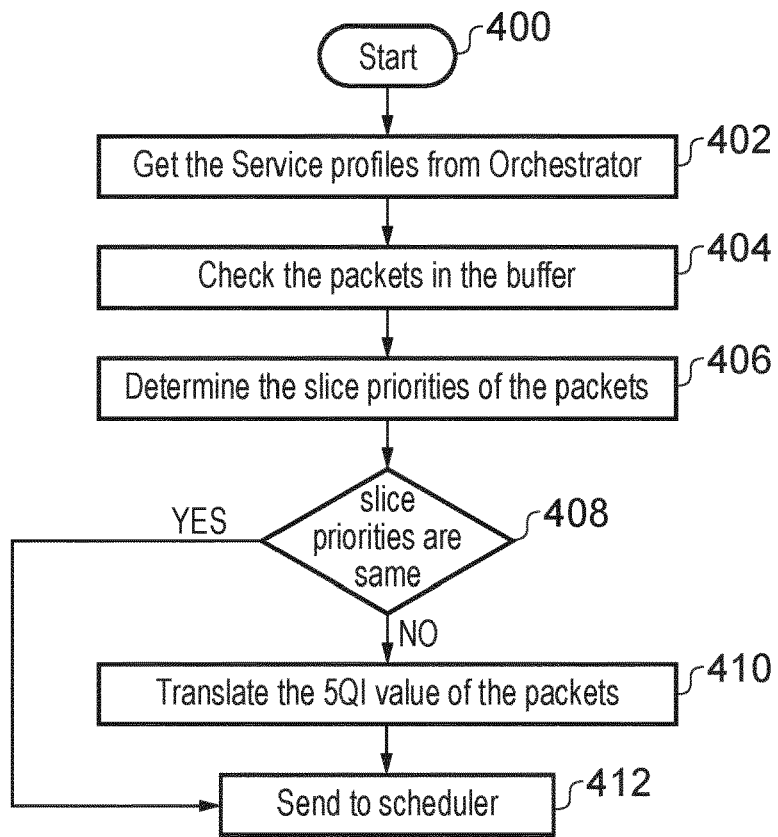
FIG. 11 is a flowchart illustrating a method according to an embodiment.

FIG. 11 is a flow chart illustrating a method performed by a first entity 10 in accordance with an embodiment. The first entity 10 described earlier can be configured to operate in accordance with the method of FIG. 11. The method can be performed by or under the control of the processing circuitry 12 of the first entity 10.

As illustrated in FIG. 11, at block 400, the process is started. As illustrated at block 402 of FIG. 11, the first entity 10 may acquire the service profiles from the second entity 20. At block 404 of FIG. 11, the first entity 10 may check for the receipt of packets, e.g. the packets received at the fourth entity (e.g. buffer) 40. At blocks 406 to 410 FIG. 11, the first entity 10 sets a second priority value for a first packet based on a comparison of a first priority value assigned to the packet with at least one reference priority value in the manner described earlier.

In more detail, at block 406 of FIG. 11, the first entity 10 determines the first priority value assigned to the packet. At block 408 of FIG. 11, the first entity 10 checks whether the first priority value assigned to the packet is the same as the at least one reference priority value. If the first priority value assigned to the packet is the same as the at least one reference priority value, the process moves directly to block 412 of FIG. 11. At block 412 of FIG. 11, the first packet is sent to the third entity (e.g. scheduler) 30. On the other hand, if the first priority value assigned to the packet is not the same as the at least one reference priority value, the process moves to block 410 of FIG. 11.

At block 410 of FIG. 11, the first priority value can be updated (or translated) in the manner described earlier. Then, at block 412 of FIG. 11, the first packet is sent to the third entity (e.g. scheduler) 30.

Figure 12:
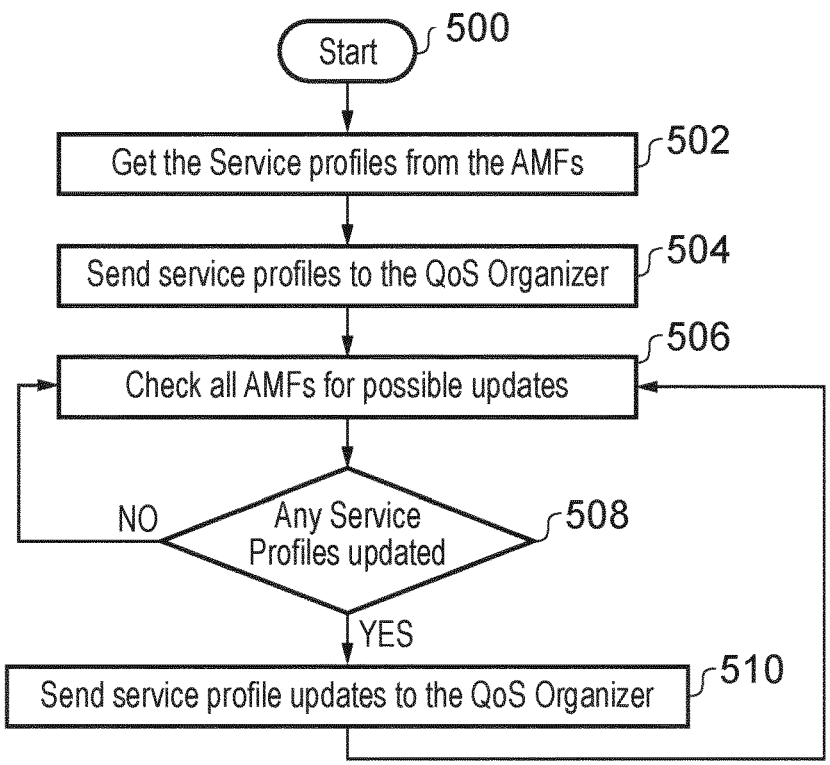
FIG. 12 is a flowchart illustrating a method according to an embodiment.

FIG. 12 is a flow chart illustrating a method performed by a second entity 20 in accordance with an embodiment. The second entity 20 described earlier can be configured to operate in accordance with the method of FIG. 12. The method can be performed by or under the control of the processing circuitry 22 of the second entity 20.

As illustrated in FIG. 12, at block 500, the process is started. As illustrated at block 502 of FIG. 12, the second entity 20 may acquire the service profiles, e.g. from the network function (e.g. AMF, SMF or UPF) nodes of the service providers. In some embodiments, as illustrated at block 504 of FIG. 12, the second entity 20 may transmit the acquired service profiles to the first entity 10. At block 506 of FIG. 12, the second entity 20 may check, e.g. with the network function nodes of the service providers, for any updates to the previously acquired service profiles.

At block 508 of FIG. 12, it may be checked whether there have been any such updates. If not, the process proceeds back to block 506 and the check for updates may be repeated. Once it is determined at block 508 of FIG. 12 that there have been updates to the service profiles, the process proceeds to block 510 of FIG. 12. At block 510 of FIG. 12, the updates may be sent to the first entity 10. The process may then proceed back to block 506 and the check for updates may be repeated.

Figure 13:
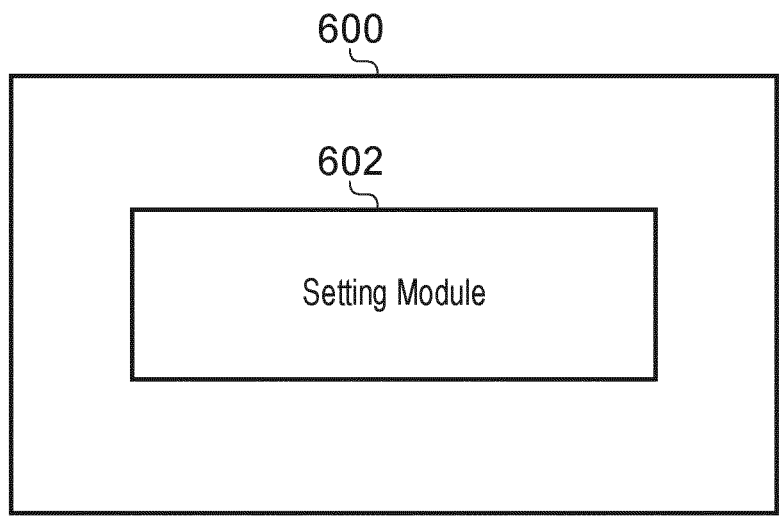
FIG. 13 is a block diagram illustrating a first entity according to an embodiment.

FIG. 13 is a block diagram illustrating a first entity 600 in accordance with an embodiment. The first entity 600 comprises a setting module 602 configured to, in response to receipt of a first packet, from a first network slice in the network, to be scheduled for a first service, set a second priority value for the first packet based on a comparison of a first priority value with at least one reference priority value. The first priority value is assigned to the first packet by a provider of the first service. The second priority value is indicative of a priority with which the first packet is to be scheduled relative to at least one other packet. The first entity 600 may operate in the manner described herein in respect of the first entity.

Figure 14:
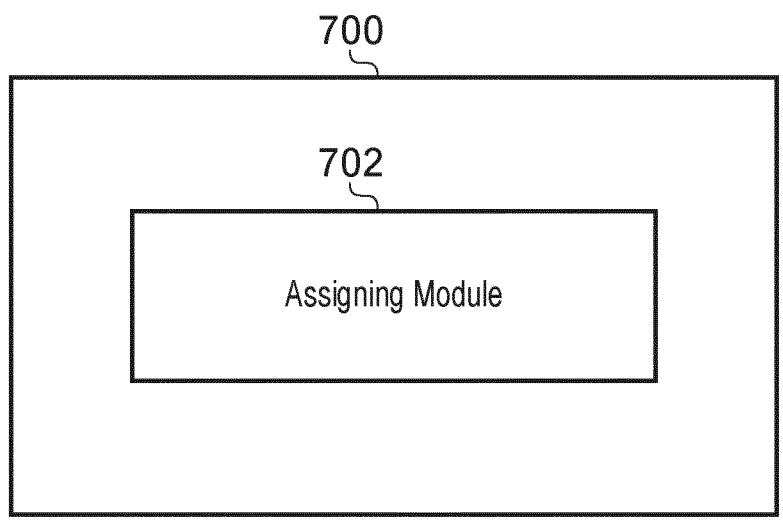
FIG. 14 is a block diagram illustrating a second entity according to an embodiment.

FIG. 14 is a block diagram illustrating a second entity 700 in accordance with an embodiment. The second entity 700 comprises an assigning module 702 configured to assign a first reference priority value to a first service based on one or more priority values assigned to the first service by one or more providers of the first service. The first reference priority value is indicative of a priority with which the first packet is to be scheduled relative to at least one other packet. The second entity 700 may operate in the manner described herein in respect of the second entity.

There is also provided a computer program comprising instructions which, when executed by processing circuitry (such as the processing circuitry 12 of the first entity 10 described earlier and/or the processing circuitry 22 of the second entity 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described earlier and/or the processing circuitry 22 of the second entity 20 described earlier) to cause the processing circuitry to perform at least part of the method described herein. There is provided a computer program product comprising a carrier containing instructions for causing processing circuitry (such as the processing circuitry 12 of the first entity 10 described earlier and/or the processing circuitry 22 of the second entity 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first entity functionality and/or the second entity functionality described herein can be performed by hardware. Thus, in some embodiments, any one or more of the first entity 10 and the second entity 20 described herein can be a hardware entity. However, it will also be understood that optionally at least part or all of the first entity functionality and/or the second entity functionality described herein can be virtualized. For example, the functions performed by any one or more of the first entity 10 and the second entity 20 described herein can be implemented in software running on generic hardware that is configured to orchestrate the entity functionality. Thus, in some embodiments, any one or more of first entity 10 and the second entity 20 described herein can be a virtual entity. In some embodiments, at least part or all of the first entity functionality and/or the second entity functionality described herein may be performed in a network enabled cloud. The first entity functionality and/or the second entity functionality described herein may all be at the same location or at least some of the entity functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there is advantageously provided a technique for handling packets in a network and/or setting priority values for services in a network. The QoS problems that occur when different service providers utilise network slices in the same network (e.g. RAN) are addressed by way of the technique described herein. The technique described herein may be performed during the creation and/or lifecycle management of network slices in the network.

In the manner described herein, it can be ensured that services with differentiated priority values from different network slices are scheduled in a fair manner. In particular, service providers can be prevented from using a QoS strategy for their own advantage, which can be particularly beneficial in cases where there is more than one service provider leasing network slices from the same MIP. At the same time, complaints from service providers on unfair scheduling can be avoided, since unfair scheduling can be prevented. The obligations of MIPs to the Government Regulation Authority, which include the fair sharing of network resources, can also be fulfilled. Moreover, as services can be scheduled in a fair manner, the targeted and expected benefit of network slicing can be advantageously achieved. More specifically, the efficiency of network slicing can be improved by way of the technique described herein. Also, congestion that would otherwise occur in the network slices can be avoided. In this way, the end user of the services can be provided with an improved QoS. The technique described herein can be useful in a RAN or any other network in which network slices are shared. The technique can be particularly advantageous where each service provider does not have its own network infrastructure.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first entity for handling packets in a network, the method comprising:
in response to receipt of a first packet, from a first network slice in the network, to be scheduled for a first service, wherein a first priority value is assigned to the first packet by a provider of the first service:
setting a second priority value for the first packet based on a comparison of the first priority value with at least one reference priority value,
wherein:
the second priority value is indicative of a priority with which the first packet is to be scheduled relative to at least one other packet of a second network slice;
the at least one reference priority value comprises at least one second reference priority value, and each second reference priority value is assigned to one other packet that is to be scheduled and that is received from one other network slice of the network; and
when the priority indicated by the first priority value is lower than a priority indicated by one or more of the at least one second reference priority values, the second priority value is set as the second reference priority value of the one or more of the at least one second reference priority values that is indicative of the highest priority; and
when the priority indicated by the first priority value is the highest of each priority indicated by the at least one second reference priority value, the second priority value is set as the first priority value.

2. A method as claimed in claim 1, wherein:
the at least one reference priority value comprises:
a first reference priority value previously assigned to the first service.

3. A method as claimed in claim 2, wherein:
the first reference priority value is previously assigned to the first service by a second entity of a provider of the network.

4. A method as claimed in claim 3, the method comprising:
acquiring the first reference priority value from the second entity.

5. A method as claimed in claim 2, wherein:
the second priority value is set as the first reference priority value if the first reference priority value is different to the first priority value; or
the second priority value is set as the first priority value if the first reference priority value is the same as the first priority value.

6. A method as claimed in claim 1, wherein:
the one other packet is to be scheduled for a second service,
wherein the second service is the same service as the first service or the same type of service as the first service.

7. A method as claimed in claim 1, wherein:
the first packet comprises data and/or control signaling for the first service.

8. A first entity comprising:
processing circuitry configured to operate in accordance with claim 1.

9. A first entity as claimed in claim 8, wherein:
the first entity comprises:
at least one memory for storing instructions which, when executed by the processing circuitry, cause the first entity to:
in response to receipt of a first packet, from a first network slice in the network, to be scheduled for a first service, wherein a first priority value is assigned to the first packet by a provider of the first service:
set a second priority value for the first packet based on a comparison of the first priority value with at least one reference priority value,
wherein the second priority value is indicative of a priority with which the first packet is to be scheduled relative to at least one other packet.

10. A first entity as claimed in claim 8, wherein:
the first entity is an entity of a radio access network, RAN.

* * * * *